United States Patent [19]

Biles

[11] Patent Number: 5,255,028
[45] Date of Patent: Oct. 19, 1993

[54] APPARATUS AND METHOD FOR PRODUCING 3-DIMENSIONAL IMAGES

[76] Inventor: Kevin Biles, 13364 Beach Ave., Marina del Rey, Calif. 90292

[21] Appl. No.: 883,676

[22] Filed: May 15, 1992

[51] Int. Cl.$^5$ .............................................. G03B 21/28
[52] U.S. Cl. .......................................... 353/7; 353/10; 353/30; 353/94; 359/462; 359/477
[58] Field of Search ................ 353/7, 10, 94, 30, 37, 353/98, 99, 119, 79; 359/458, 449, 462, 466, 471, 475, 477; 352/86, 87

[56] References Cited

U.S. PATENT DOCUMENTS

| | | | |
|---|---|---|---|
| 2,336,508 | 12/1943 | Smith et al. | 353/37 |
| 2,934,601 | 4/1960 | Oppenheimer | 353/30 |
| 2,952,182 | 9/1960 | Marks et al. | 88/16.6 |
| 3,006,241 | 10/1961 | Marks et al. | 88/16.6 |
| 4,303,316 | 12/1981 | McElveen | 352/86 |
| 4,747,665 | 5/1988 | O'Brien | 359/462 |
| 4,974,957 | 12/1990 | Kaelin | 353/10 |
| 5,024,521 | 6/1991 | Zuchowski et al. | 352/86 |
| 5,052,797 | 10/1991 | Madser | 353/98 |

FOREIGN PATENT DOCUMENTS 8302169  6/1983  World Int. Prop. O. .......... 359/462

Primary Examiner—William A. Cuchlinski, Jr.
Assistant Examiner—William C. Dowling
Attorney, Agent, or Firm—Poms, Smith, Lande & Rose

[57] ABSTRACT

Systems and methods for producing the sensation of 3-dimensional viewing are disclosed. Apparent 3-dimensional images are produced by simultaneously projecting at least two related images onto at least two associated projection screens, creating planes of images with each image plane having its own depth characteristic. Then at least two images are reflected or transmitted simultaneously by ghost glass to viewers who observe a composite image. The composite image provides viewers with the illusion of depth in the form of an apparent 3-dimensional image.

18 Claims, 2 Drawing Sheets

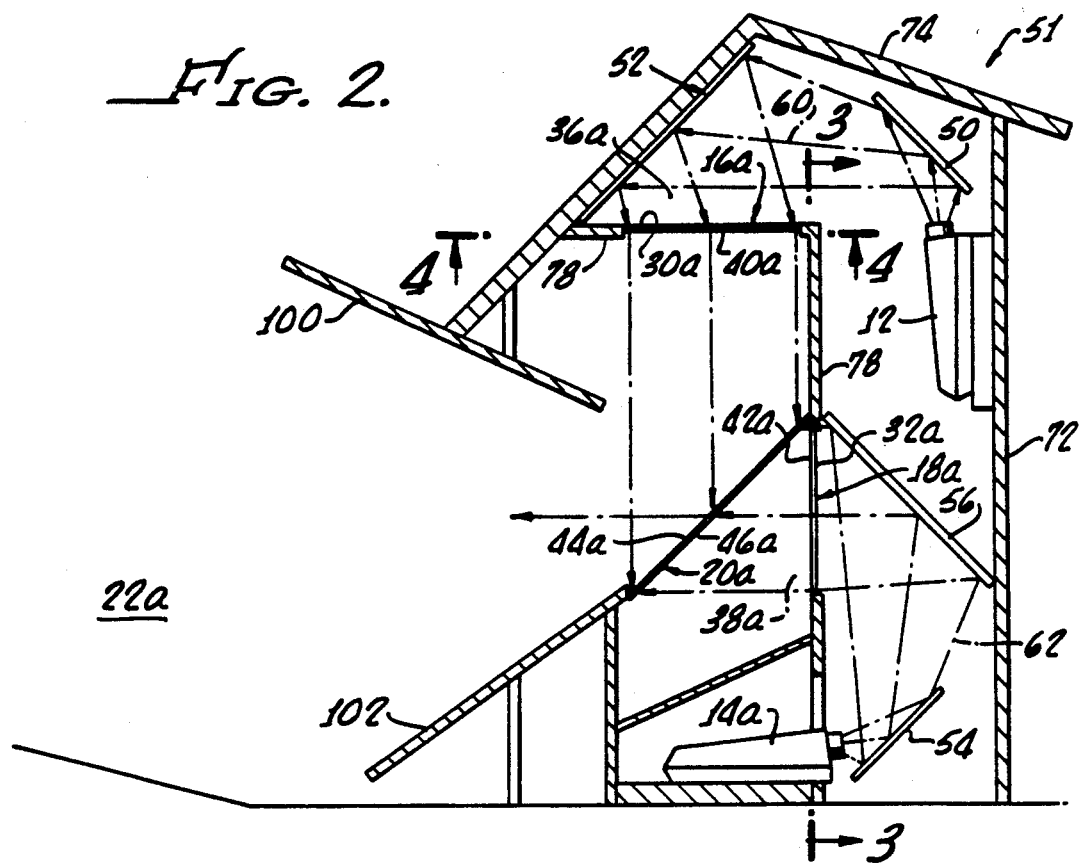
FIG. 2.
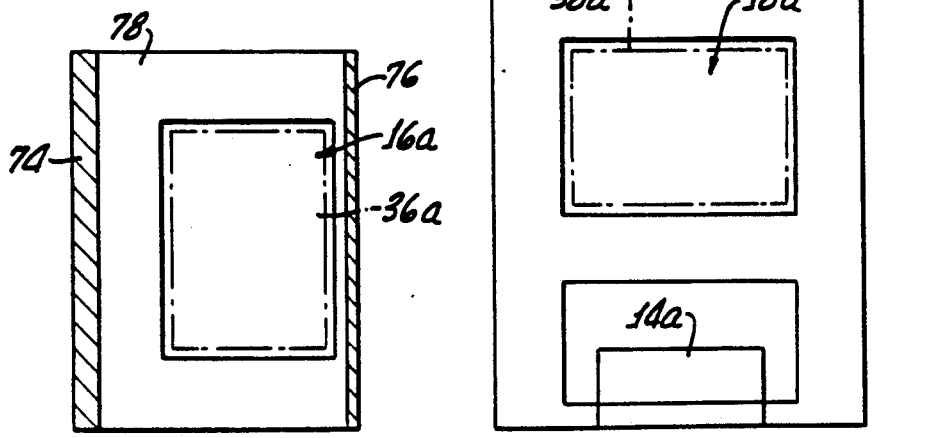
FIG. 3.
FIG. 4.

APPARATUS AND METHOD FOR PRODUCING 3-DIMENSIONAL IMAGES

BACKGROUND OF THE INVENTION

1. Field of the Invention

The present invention relates generally to systems for producing apparent 3-dimensional images. More particularly, the present invention relates to systems for projecting images onto separate projection screens and then displaying the images in the form of planes of projection in such a manner as to provide audiences with a sensation of 3-dimensional viewing.

2. Description of Related Art

For many decades the motion picture and video display industries have attempted with various degrees of success to provide viewing systems which give a sensation of depth or 3-dimensional viewing to the audience. One early approach involved providing a greater visual depth for viewers of projections screens such as motion picture audiences. This approach consisted of increasing the width of the projection screen relative to its height and curving the projection screen. These screen modifications result in a viewing area which is very close to the normal human visual range and additionally creates increased depth illusion.

Another method is known as stereoscopic viewing and consists of simultaneously projecting images, photographed at different angles, onto a screen through polarizing filters which are oriented at right angles to each other. Viewers are required to wear a pair of special polarizing viewing spectacles which allows each eye to see only one image. The viewer's brain combines the images so that a resultant image having apparent 3-dimensional characteristics is observed.

Another system for creating 3-dimensional viewing is described in U.S. Pat. No. 2,952,182 and consists of projecting one image on a front screen and projecting a second image on a back screen which is located directly behind the front screen. In order for a viewer to observe the images projected on both screens, the front screen is formed of a wire mesh material which is painted with white pigment on the front, to maximize reflection, and painted black on the back to maximize absorption. The rear screen is a rear projection screen and allows light to pass through it so that it appears to originate from the screen. In order to avoid image "bleed" created by light from the front screen passing through the mesh and reflecting from the rear screen, a filter is positioned between the front and rear screens and at an angle to the front screen. This filter reflects about 80% of the light striking it while allowing sufficient light to pass through so that the viewer can observe the back screen. A real drawback associated with this system is the reduced visualization of the back screen caused by the presence of the filter. That is, only a small percentage of the light originating from the rear screen is transmitted to the viewer opposite the front screen, resulting in low intensity images.

None of the systems described above provides suitable apparent 3-dimensional viewing without stereoscopic glasses. Furthermore, none of these prior art systems provide relatively small screens and audience sizes of less than about 50 individuals. For example, display booths which utilize video projection equipment and screens to advertise, provide public information, or promote services are restricted to conventional small screen viewing systems without the enhanced effect of 3-dimensional images.

Accordingly, it is an object of the present invention to provide a system for 3-dimensional viewing which does not require viewers to wear stereoscopic viewing spectacles.

It is also an object of the present invention to provide a system for 3-dimensional viewing without image "bleed".

It is further an object of the present invention to provide a system for 3-dimensional viewing configured for display booths or kiosks designed for small screens and limited audience sizes.

It is another object of the present invention to provide a system for 3-dimensional viewing which can be constructed economically.

SUMMARY OF THE INVENTION

The present invention accomplishes the above-mentioned objectives and others by providing a system for apparent 3-dimensional viewing by projecting at least two related images onto at least two associated projection screens and creating planes of images with each image plane having its own depth characteristic. The at least two images are reflected or transmitted simultaneously by ghost glass to viewers who observe a composite image. The composite image provides viewers with the illusion of depth in the form of an apparent 3-dimensional image.

More particularly, the present invention provides a system for viewing apparent 3-dimensional images which includes a device for projecting a first image, generally a foreground image, and a device for projecting a second image, generally a background image. The system further includes a first projection screen positioned to receive the foreground image and a second projection screen positioned to receive the background image. The second projection screen is additionally positioned at an approximately 90° angle to the first projection screen. Finally, a reflecting and transmitting glass plate is positioned to receive and reflect the foreground image to a viewer. The glass plate is also positioned to receive and to transmit the background image to the viewer simultaneous with reflecting the foreground image. The resulting composite image observed by the viewer has the illusion of depth created by the apparent distances between the foreground and background image planes.

The system for producing an apparent 3-dimensional image of the present invention is particularly suitable for applications involving relatively small viewing audiences on the order of 1–50 viewers. For example, kiosks and similar display booths used at expositions and in convention showrooms can be advantageously designed to incorporate systems for producing apparent 3-dimensional images according to the present invention. Typically, these applications involve viewers standing in the general vicinity of the booth or kiosk and viewing the apparent 3-dimensional images projected within the viewers's line of sight. Advantageously, the projection screens, projectors and ghost glass can be assembled and dismantled quickly, making the systems of the present invention particularly suitable for reusable, short term applications. In preferred embodiments of the present invention, the background image and the foreground image are filmed separately with its own lighting and depth perspective. Thus, when each image is projected on its associated screen, it appears in a plane having its own inherent perspective. When viewers simultaneously view the screens, the images are combined to provide a resulting composite image with the illusion of a complete scene with depth characteristics.

The various features and advantages of the present invention will become apparent from the following detailed description, taken in conjunction with the accompanying drawings which illustrate, by way of example, the principles of the present invention.

BRIEF DESCRIPTION OF THE DRAWINGS

FIG. 2 is a schematic drawing of a side elevation of an exemplary embodiment of the present invention including first and second projectors, mirrors for propagating planes of projected images, front and back projection screens, and ghost glass plate;

FIG. 3 is a front view of a booth panel illustrating cut-outs adapted for the back projection screen and a projector; and FIG. 4 is a front view of a booth panel illustrating a cut-out adapted for the front projection screen.

DESCRIPTION OF THE PREFERRED EMBODIMENTS

Figure 1:
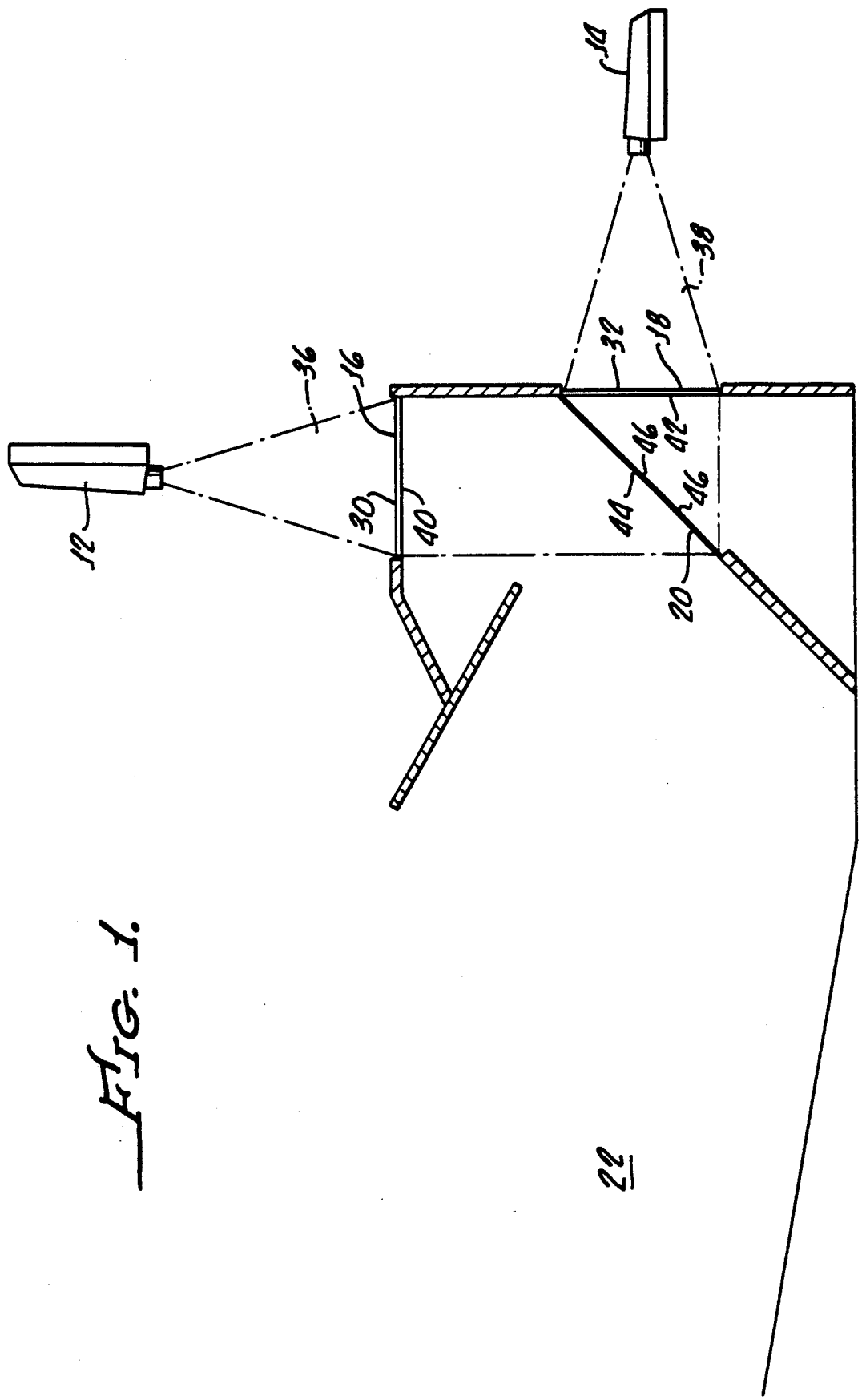
FIG. 1 is a schematic drawing of a side elevation of a system for producing 3-dimensional viewing of the present invention including first and second image projectors, front and back projection screens, and ghost plate glass.

The present invention is based upon the discovery that rear projection screens used in combination with a single plate of ghost glass or smoked glass can provide viewers with composite images which give the illusion of 3-dimensional viewing. By utilizing the light interaction properties of rear projection screens and the reflective and transmissive surfaces of ghost glass, planes of projected images are positioned in layers and viewed one in front of the other. In accordance with the present invention, each projection screen can be provided with separate but related program material creating image planes for transmitting through or reflecting from a ghost glass plate. The different planes of images combine at the glass plate to form a composite image and provide viewers with the illusion of depth or an apparent 3-dimensional image.

Broadly speaking, the scope of the present invention includes systems for producing apparent 3-dimensional images which include a plurality of means for projecting images, and a plurality of projection screens, with each of the projection screens positioned to receive and to transmit at least one of the projected images. Additionally, systems of the present invention include at least one glass plate having a reflective surface and a transmissive surface, with the glass plate positioned to receive at least one of the transmitted images at its reflective surface, and also positioned to receive at least one of the transmitted images at its transmissive surface for transmitting.

More particularly, and referring to FIG. 1 there is illustrated a side elevation of a general system for producing apparent 3-dimensional images according to the present invention which includes first projecting device 12 positioned for projecting a first image 36 to first projection screen 16 and second projecting device 14 positioned for projecting a second image 38 to second projection screen 18. Second projection screen 18 is additionally positioned at an approximately 90° angle to first projection screen 16. A reflecting and transmitting glass plate 20 is positioned to receive and reflect first image 36 from first projection screen 16 and to receive and transmit second image 38 from second projection screen 18. Viewers located in viewing area 22 are suitably positioned to observe reflected first image 36 and transmitted second image 38 in the form of a composite image having apparent 3-dimensional characteristics.

As a feature of the present invention, glass plate 20 has light reflecting properties and light transmitting properties which result in a clear composite image having high visualization characteristics. More particularly, glass plate 20 has a highly reflective surface 44 for reflecting first image 36 and a highly transmissive surface 46 for transmitting second image 38. Viewers in viewing area 22 observe transmitted image 38 and reflected image 36 as a high quality, highly visible composite image. Suitable glass plates 20 include glass plates known as ghost glass or smoked glass having thicknesses of at least 1/16". Typically these glass plates transmit from approximately 40% to approximately 60% of the light striking surface 46 and reflect from approximately 40% to approximately 60% of the light striking surface 44.

Ghost glass plates or smoked glass plates utilized in the systems of the present invention have dimensions which are primarily dependent upon the overall dimensions of the viewing system, or the total space utilized by the projection devices 12 and 14, and projection screens 16 and 18, as well as the size of the final composite image. Typical viewing systems range in sizes at their base from approximately 3 feet × 4 feet to approximately 10 feet × 15 feet and are typically at least 5 feet high. The associated size of ghost glass plates utilized in these systems varies from less than 1 foot × 1 foot to several feet in width and height. As described in more detail below, in order to provide viewers with maximum aesthetic viewing value, typical viewing systems incorporate ghost glass plates without the use of support rails at the sides or top of the ghost glass. Accordingly, the size of the viewing system and the final composite image, in effect, is limited by the practical size of the ghost glass which can be incorporated into the system with minimum physical support.

In accordance with the present invention, first projection screen 16 and second projection screen 18 are screens known in the video and movie production industry as rear projection screens and are typically utilized in viewing conditions having significant amounts of ambient lighting. Ambient light contacting front surfaces of these projection screens is absorbed and not reflected, and images projected onto their back surfaces are transmitted. Thus, audiences generally are less bothered under high ambient lighting conditions. Commercially sold by a number of sources including Stewart Film Screens, Raven, and DA-LITE, these screens are available in a variety of sizes and a variety of sensitivities to projected light, a characteristic known as gain. Gain refers to the degree to which transmitted light is diffused, with higher gains diffusing less than lower gains. Typically, larger, and particularly wider screens, are installed in areas designed for larger viewing audiences. The wider the back projection screen, the lower the gain of the screen material and the higher the degree of light diffusion. On the other hand, smaller viewing audiences typically utilize smaller and narrower back projection screens with a lower gain. A consequence of the various gain configurations is that lower gain screens which diffuse light to a greater degree require a high intensity of projected image. Conversely, higher gain screens which are also more transparent will effectively transmit high quality images which are projected with less intensity.

For purposes of the present invention, rear projection screens 16 and 18 transmit a high percentage of the light striking rear surfaces 30 and 32. Thus, first and second images 36 and 38, projected from first device 12 and second device 14, respectively, are effectively transmitted by rear projection screens 16 and 18 and clearly visible from front surfaces 40 and 42 of the rear projection screen. In accordance with the practice of the present invention, images transmitted from front surfaces 40 and 42 are not observed directly, but are viewed subsequent to their interaction with glass plate 20. That is, first image 36 is reflected by glass plate surface 44 and second image 38 is transmitted by glass plate 20, effectively providing an apparent 3-dimensional composite image for observation by viewers in viewing area 22.

Exemplary embodiments of the present invention utilize rear projection screens 16 and 18 which transmit from 90%-95% of the light striking back surfaces 30 and 32 and absorb from 90%-95% of the light striking front surfaces 40 and 42. With respect to screen dimensions, suitable rear projection screens vary in size according to the overall system dimensions. Those skilled in the art will appreciate that suitable screen sizes are also dependent upon the image sizes and, as discussed in more detail below, the optical path of each of the images.

Typically, rear projection screens 16 and 18 are planar and rectangularly shaped and vary in dimensions, depending upon the overall system size, from 3 feet to 10 feet in height and from 4 feet to 13.4 feet in width. For example, kiosk type viewing booths having width and length dimensions of between 4 and 8 feet, respectively, can incorporate second rear projection screens which vary from 3 feet×4.3 feet to 5.3 feet×8.6 feet. Similarly, a viewing booth having width and length dimensions of between 4 and 8 feet can have first rear projection screens which vary from 4 feet×3 feet to 6 feet×4.6 feet.

Another feature of the present invention associated with the light interaction characteristics of rear projection screen 16 and 18 and glass plate 20 relates to the absence of image "bleed". That is, light which may reflect from surface 46 of glass plate 20 is absorbed by second rear projection screen 18. In the absence of the ability of rear projection screen 18 to absorb light striking front surface 42, a certain amount of second image 38 will reflect again to surface 46 of glass plate 20 and result in image "bleed" or poor quality composite images having low resolution. Similarly, any light reflected from surface 44 to first projection screen 16 will be absorbed by front surface 40 and preclude first image bleed. The result is a clear, highly visible, "bleed" free composite image of first image 36 reflected from glass plate 20 and second image 38 transmitted from glass plate 20. Moreover, the composite image has apparent depth as a result of the subject matter of the foreground and background images and the distances between the image planes.

In operation, the system of the present invention utilizes the transmission and reflection characteristics of rear projection screens 16 and 18 and glass plate 20, to provide image planes, projected one in front of the other, for direct observation by viewers in viewing area 22. For example, program material in the form of a foreground image 36 and separate program material in the form of a background image 38 can be projected simultaneously to rear projection screens 16 and 18, respectively. At screens 16 and 18 the images are transmitted to glass plate 20 where foreground image 36 is reflected and background image 38 is transmitted to viewers in viewing area 22. Each of the projected images is a plane of projected light with the foreground image 36 positioned in front of background image 38. Viewers located in viewing area 22 observe a resulting composite image of the background image, appearing farthest away, and the foreground image, appearing closer.

Suitable devices for projecting images 12 and 14 include virtually any apparatus having the capability of projecting light from a source to a screen, including electronic projections. Even though devices 12 and 14 can be sources for film projection typically utilized in the motion picture theaters, laser video projectors, and slide projectors, the preferred configuration of devices 12 and 14 for projecting images is laser discs. As mentioned above, in the preferred operation, each projected image includes separately created program material. Thus, for example, when device 14 projects a background image and device 12 projects a foreground image, the separate program material for each image is filmed separately so that each image has its own inherent foreground or background perspective. When the image planes are combined, the resulting composite image provides the illusion of a complete scene with depth characteristics. Additionally, in order to provide synchronization between projectors, special interface equipment between the projectors keeps them operationally "interlocked".

Referring now to FIG. 2 there is illustrated an embodiment of the present invention useful for systems having certain minimum image size requirements and a relatively small area in which to position the system. The system 51 for producing 3-dimensional images detailed in FIG. 2 is similar in function and design to that shown in FIG. 1 and incorporates all the features of the system of FIG. 2 which are illustrated by like numerals. System 51 further includes first mirror 50 positioned to receive first image 36a from device 12a, and second mirror 52 positioned to receive first image 36a reflected from mirror 50 and to reflect first image 36a to projection screen 16a. Similarly, system 51 includes third mirror 54 positioned to receive second image 38a from device 14a, and fourth mirror 56 positioned to receive second image 38a from mirror 54 and to reflect second image 38a to second projection screen 18a.

Those skilled in the art will appreciate that mirrors 50, 52, 54, and 56 incorporated in the preferred embodiment of FIG. 2 provide a means to fold the planes of projected images 36a and 38a. This effectively allows for an increased image path length without simultaneously requiring an associated larger system or viewing booth. Thus, viewers located in viewing area 22a observe composite images having convenient viewing proportions. Systems of the present invention which utilize similar projection devices 12a and 14a, and similar overall system dimensions but do not incorporate mirrors 50, 52, 54, 56 provide smaller composite images for viewers in viewing area 22a due to the decreased image path length 60 and 62.

Those skilled in the art will appreciate that in order to position mirrors 50, 52, 54, and 56 for appropriately receiving and reflecting images 36a and 38a, the mirrors must be located at appropriate angles within image paths 60 and 62. More particularly, depending upon the total system size and the placement of device 12a with respect to rear projection screen 16a, mirrors 50 and 52 are positioned to form image path 60, effectively folding the image plane and appropriately projecting image 36a to projection screen 16a. Similarly, mirrors 54 and 56 are positioned to form image path 62, effectively folding the image plane and appropriately projecting image 38a to projection screen 18a.

Preferred embodiments of the present invention further utilize system housing having back wall 72, ceiling 74, and internal panels 76 and 78 which can provide support for suspending and/or attaching mirrors 50, 52, 54, and 56 at the appropriate predetermined angle to image paths 60 and 62. FIG. 3 and FIG. 4 illustrate front views of panels 76 and 78, respectively. More specifically, as shown in FIG. 3, panel 76 incorporates cut-out portions sized to accommodate part of device 14a and rear projection screen 18a. FIG. 4 similarly illustrates a front view of panel 78 having a cut out portion sized to accommodate rear projection screen 16a.

The system housing also provides support for projecting devices 12a and 14a, glass plate 20a and projection screens 16a and 18a. Advantageously, the housing additionally acts as a booth or kiosk frame and can be designed to eliminate or minimize the visibility of devices 12a and 14a and projection screens 16a and 18a, thus providing viewers with a view which is limited to glass plate 20a and the composite image.

While a variety of mirror types have utility in the systems for producing 3-dimensional images of the present invention, the mirrors are preferably silvered front surfaces known in the art as front surface projection mirrors. The most preferred mirror is mylar mirror front surface. These mirrors are commercially available under the trade name Mirrorlite PGX 94% reflective from Hudson Photographic Industries, N.Y. Like the dimensions of rear projection screens 16a and 18a, suitable dimensions of mirrors 50, 52, 54, 56 are dependent upon the overall dimensions of system 51. Additionally, since images 36a and 38a generally increase in size as the image path increases, mirrors 52 and 56 are generally larger than mirrors 50 and 54 which receive image 36a and 38a from devices 12a and 14a respectively. Furthermore, the mirrors are generally rectangularly shaped and planar, although systems which incorporate square shaped mirrors are within the scope of the present invention.

For systems configured for viewing booths or kiosks which range in size from 3 feet×4 feet to 10 feet×15 feet, mirrors 50 and 52, or typically foreground mirrors, are from 1 foot to 10 feet in height and from 4 feet to 13.4 feet in width. Mirrors 54 and 56, or typically background mirrors, range in 1 foot to 10 feet in height and from 4 feet to 13.4 feet in width.

An exemplary process for producing high quality 3-dimensional viewing in accordance with the present invention, includes providing foreground imaging material for projecting from device 12 and providing background imaging material for projecting from device 14, and then simultaneously projecting a foreground image 36 to first projection screen 16 and a background image 38 to second projection screen 18. Simultaneously, viewers in area 22 observe a composite image at glass plate 20. The composite image has the appearance of 3-dimensional like depth and includes the foreground image 36 and background image 38 which appears to originate in a plane behind the foreground image.

The following non-limiting example describes a specific viewing system in the form of a booth which incorporates projectors, projection screens, mirrors, and a glass plate for producing high quality visualization of apparent 3-dimensional images according to the present invention as illustrated in FIG. 2.

EXAMPLE

In a exposition auditorium a display kiosk was constructed having the general structure shown in FIG. 2. The kiosk height at its highest point A was 11'10", its overall depth was 7'9", and its width was 9'10¼". Barco 600 projectors were installed to function as a front projector 12a and a rear projector 14a. The front projector 12a was mounted as shown on rear wall 72 so that the projector is distanced at least 5" from rear wall 72. The rear projector was similarly anchored on the floor of the booth. Projection mirrors 50, 52, 54, and 56 formed of Mirrorlite PGX 94% reflective, were then incorporated within the display kiosk as shown. The mirrors were rectangular in shape and mounted so that the longer side coincided with the width of the kiosk and so that the images were appropriately propagated to glass plate 20a. The mirrors had the following dimensions:

| Projection Mirror 50 | 3'0" × 2'0" |
| Projection Mirror 52 | 4'0" × 3'9" |
| Projection Mirror 54 | 3'0" × 2'0" |
| Projection Mirror 56 | 5'0" × 3'9" |

Interior plywood panels 78 and 76 were mounted at a 90° angle to each other as shown and extended the width of 35 the kiosk. Panel 78 was 5'8" in width and 4'0" in height and included a cut-out portion sized to fit rear projection screen 16a. Panel 76 was 5'8" in width and 9'0" in height and included a cut-out portion sized the dimensions of rear projection screen 18. Panel 76 additionally included a cut-out portion sized for effective projector 14a access. Rear projection screen 16a, sized 4'4"×3'4", was mounted within the cut-out portion of panel 78. Likewise, rear projection screen 18a, sized 3'8"×6'2", was mounted within the appropriate cut-out portion of panel 76.

A section of ghost glass plate purchased under the trade name Grey E Glass from PPG in New York having a thickness of ¼" was mounted with its reflective side 44a facing upward. In order to avoid interfering with any image planes, the ghost glass 20a has no support rails at top or sides.

Finally panels 100 and 102 were mounted to function as projections to prevent direct visualization of projection screen 16a and the area housing projector 14a.

Having thus described exemplary embodiments of the present invention, it should be noted by those skilled in the art that the disclosures herein are exemplary only, and that alternative, adaptations, and modifications may be made within the scope of the present invention. For example, the 3-dimensional systems of the present invention can be prepared for "wide screen" viewing. By ganging pairs of systems as described above and then projecting the image planes through widened mirrors and screens, much larger composite images can be created. These "wide screen" versions are suitable for large and preferably permanent installations with medium sized audience requirements.

The foregoing detailed description is to be clearly understood as given by way of illustration and example only, the spirit and scope of this invention being limited solely by the appended claims.

What is claimed is:

1. A system for producing apparent 3-dimensional images, said system comprising:
   a plurality of means for projecting images;
   a plurality of rear projection screens, each of said rear projection screens having a rear surface and a front surface and transmitting 90 to 95 percent of light incident on said rear surface while absorbing 90 to 95 percent of light incident on said front surface, each of said rear projection screens being positioned to receive and transmit at least one of said projected images; and
   at least one plate having a reflective surface and a transmissive surface, said plate being positioned to receive at least one of said transmitted images at said reflective surface for reflection to a viewer and said plate being positioned to receive at least one of said transmitted images at said transmissive surface for transmitting to said viewer.

2. The system for producing apparent 3-dimensional images of claim 1 wherein said plate is ghost glass.

3. A system for producing apparent 3-dimensional viewing, said system comprising:
   means for projecting a first image;
   means for projecting a second image;
   a first projection screen positioned to receive and transmit said first image;
   a second projection screen positioned to receive and transmit said second image, said second projection screen being disposed at a substantially 90° angle to said first projection screen;
   each of said first projection screen and said second projection screen transmitting at least 90 to 95 percent of the respective image received thereon, and each of said first projection screen and said second projection screen also absorbing 90 to 95 percent of light incident thereon from a respective direction opposite to said projected image; and
   a glass plate having a reflective surface and a transmissive surface, said glass plate being positioned at a substantially 45° angle to said first projection screen and at a substantially 45° angle to said second projection screen, and wherein said reflective surface is disposed to reflect said first image and said transmissive surface is disposed to transmit said second image.

4. The system for producing apparent 3-dimensional images of claim 3 wherein said first projection screen and said second projection screen are rear projection screens.

5. The system for producing apparent 3-dimensional images of claim 3 wherein said glass plate is formed of ghost glass.

6. The system for producing apparent 3-dimensional images of claim 3 wherein said first and second projection screens are sized from approximately 3 feet to 10 feet in height and from 4 feet to 13.4 feet in width.

7. The system for producing apparent 3-dimensional images of claim 3 wherein said glass plate has a thickness of at least ¼".

8. The system for producing apparent 3-dimensional images of claim 3 further including at least one mirror positioned for reflecting said first image to said first projection screen.

9. The system for producing apparent 3-dimensional images of claim 3 further including at least one mirror positioned for reflecting said second image to said second projection screen.

10. A system for producing apparent 3-dimensional viewing, said system comprising:
    means for projecting a foreground image;
    means for projecting a background image;
    a first rear projection screen positioned to receive and transmit said foreground image;
    a second rear projection screen positioned to receive said background image, said second rear projection screen disposed at a substantially 90° angle to said first rear projection screen;
    at least two foreground front silvered mirrors positioned to propagate said foreground image from said means for projecting a foreground image to said first rear projection screen;
    at least two background front silvered mirrors positioned to propagate said background image from said means for projecting a background image to said second rear projection screen; and
    a ghost glass plate having a reflective surface and a transmissive surface, said ghost glass plate positioned at a substantially 45° angle to said first rear projection screen and positioned at a substantially 45° angle to said second rear projection screen, and wherein said reflective surface is disposed to reflect said foreground image and said transmissive surface is disposed to transmit said background image.

11. The system for producing apparent 3-dimensional viewing of claim 10 wherein said first rear projection screen is from 3 feet to 10 feet in height and from 4 feet to 13.4 feet in width.

12. The system for producing apparent 3-dimensional viewing of claim 10 wherein said second rear projection screen is from 3 feet to 10 feet in height and from 4 feet to 13.4 feet in width.

13. The system for producing apparent 3-dimensional images of claim 10 wherein said at least two foreground front silvered projection mirrors are from 1 foot to 10 feet in height and from 4 feet to 13.4 feet in width.

14. The system for producing apparent 3-dimensional images of claim 10 wherein said at least two background front silvered projection mirrors are from 1 foot to 10 feet in height and from 4 feet to 13.4 feet in width.

15. The system for producing apparent 3-dimensional images of claim 10 wherein said ghost glass plate is sized from approximately 5'8" in width and approximately 4'4" in height and at least 1/16" in thickness.

16. A method for producing apparent 3-dimensional images comprising the steps of:
    projecting a first image to a first rear projection screen;
    transmitting at least 90 to 95 percent of said first image through said first rear projection screen;
    simultaneously with projecting said first image, projecting a second image to a second rear projection screen, transmitting at least 90 to 95 percent of said second image through said second rear projection screen, positioning said second rear projection screen at a 90° angle to said first rear projection screen;
    positioning a ghost glass plate at a 45° angle to said first rear projection screen and at a 45° angle to said second rear projection screen, said ghost glass plate having a light reflecting surface and a light transmitting surface, positioning said light reflecting surface to reflect said first image and positioning said light transmitting surface to transmit said second image;

absorbing respectively with said first rear projection screen and said second rear projection screen 90 to 95 percent of light incident thereon from a direction opposite to said first and said second images; and simultaneously causing said projected first image to reflect from said ghost glass plate and said projected second image to transmit from said ghost glass plate to form a composite apparent 3-dimensional image for viewing.

17. The process of claim 16 wherein said first image is a foreground image and said second image is a background image.

18. The process of claim 16 wherein projecting said first and second images to said first and second rear projection screens and positioning said ghost glass plate is carried out within a housing having dimensions of from about 3 feet×4 feet to about 10 feet×15 feet.

* * * * *